Nov. 23, 1965 H. W. ANDERSON 3,219,398

ARTICULATED ROLLER BEARING CONSTRUCTION

Filed Nov. 19, 1962 3 Sheets-Sheet 1

Inventor.
Howard W. Anderson.
By. Brown, Jackson, Boettcher & Dienner
Attys.

Nov. 23, 1965 H. W. ANDERSON 3,219,398
ARTICULATED ROLLER BEARING CONSTRUCTION
Filed Nov. 19, 1962
3 Sheets-Sheet 2
Fig. 5.
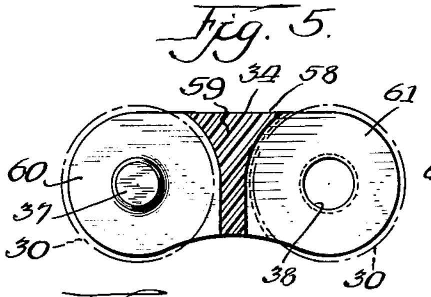
Fig. 6.
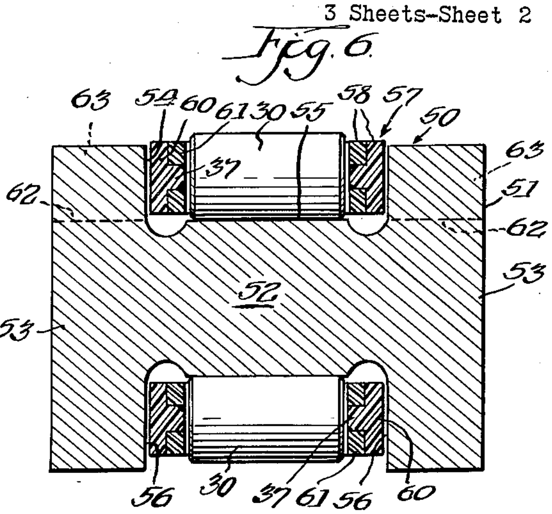
Fig. 8
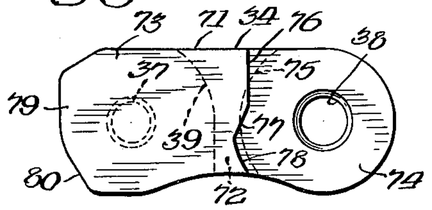
Fig. 9.
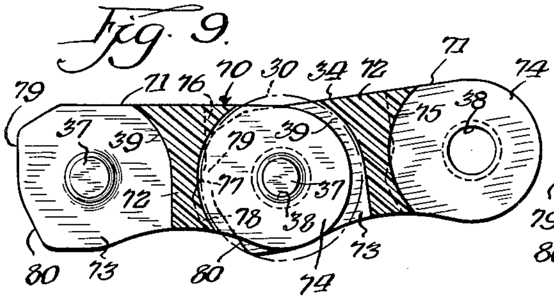
Fig. 10
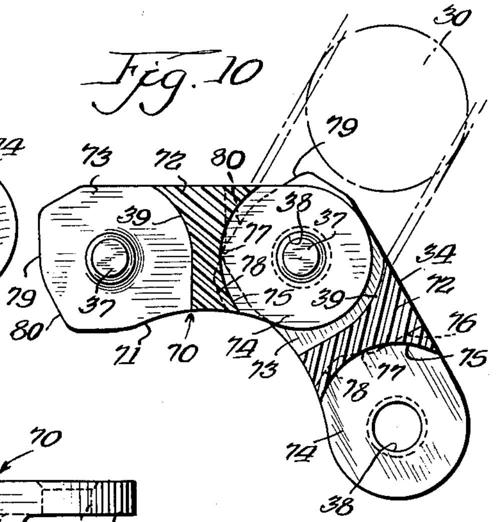
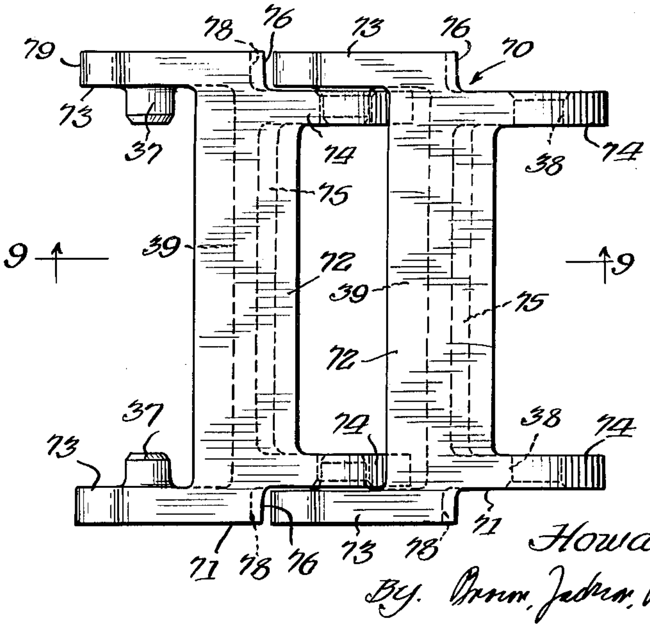
Fig. 7.
Inventor:
Howard W. Anderson
By. Brown, Jackson, Boettcher & Dienner
Attys.

Nov. 23, 1965 H. W. ANDERSON 3,219,398
ARTICULATED ROLLER BEARING CONSTRUCTION
Filed Nov. 19, 1962 3 Sheets-Sheet 3
Fig. 11.
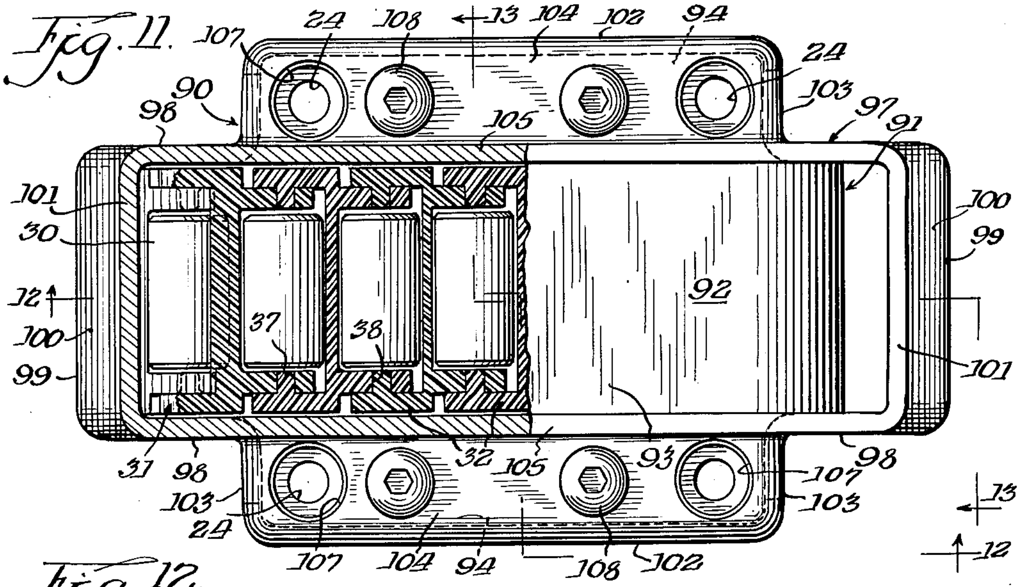
Fig. 12.
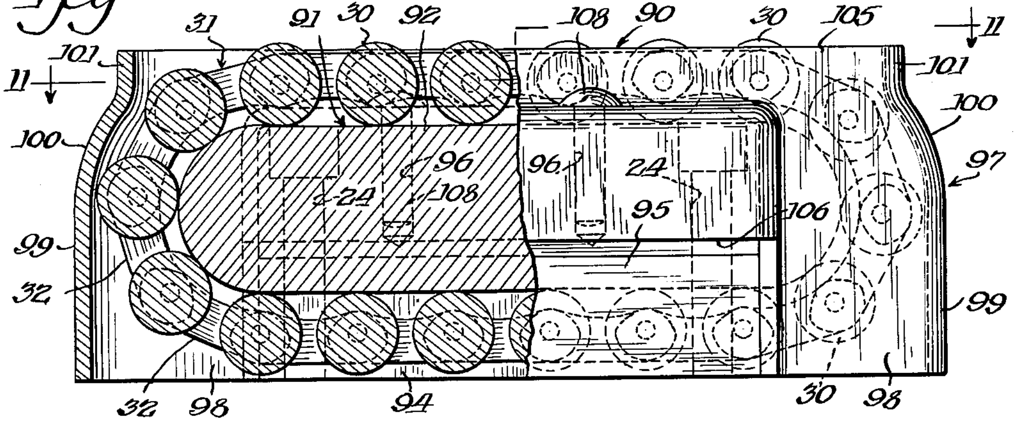
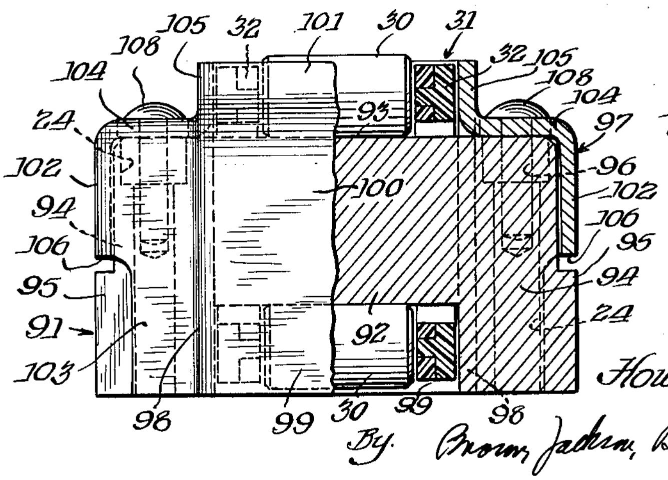
Fig. 13.
Inventor.
Howard W. Anderson,
By. Brown, Jackson, Boettcher & Dienner
Attys.

United States Patent Office 3,219,398

Patented Nov. 23, 1965

1

3,219,398
ARTICULATED ROLLER BEARING CONSTRUCTION

Howard W. Anderson, Muskegon, Mich., assignor to The Kaydon Engineering Corporation, Muskegon, Mich., a corporation of Michigan Filed Nov. 19, 1962, Ser. No. 241,100
4 Claims. (Cl. 308—6)

The present invention relates to an articulated roller bearing construction.

Recirculating roller bearings have commonly been provided by disposing a plurality of rollers transversely of an endless guiding channel about a bearing block, and providing means to retain the rollers in the channel. The rollers were moved in one direction or the other by the direct engagement therewith of adjacent rollers. Efficiency in such bearings is relatively low, since there is considerable friction and resulting wear between the rollers, sliding and skewing of the rollers, a tendency to lock up, and the movement of the rollers tends to be erratic and unpredictable. More recently, it has been proposed to connect the rollers in spaced relation by means of an endless articulated cage formed by pairs of links extending between the ends of adjacent rollers. Such recirculating roller bearings provide a very appreciable advance over the earlier cageless constructions, but do not represent the ultimate in this type of construction.

The bearing construction provided by the present invention surpasses prior articulated roller bearing structures in several respects. The cage according to the present invention is of a construction providing for the necessary travel of the rollers while maintaining the rollers out of contact with each other and allowing free rotational movement of each roller, and at the same time eliminates the need for any means for journalling the rollers in the pivoted links of the cage, such as roller shafts, gudgeons, trunnions, or the like. Thus the necessary rotation and travel of the rollers is provided for, while the cage is greatly simplified by elimination of journalling means for the rollers. Frictional forces are thus greatly reduced, and keystoning and locking up of the rollers is entirely eliminated, while the desired guidance and prevention of skewing of the rollers is achieved.

The form of the links in the articulated cage is such as to prevent unintended separation or removal of the rollers from the cage, in spite of the fact that journalling means are not employed. The formation of the links, together with the use of a suitably resilient material therefor, provides for quick and easy assembly and disassembly of the cage, as well as assembly of the rollers in the cage. At the same time, the links minimize wear and friction due to rotation of the rollers. The bearing construction provides for a race on which the rollers are guided by means of the cage, the rollers being held out of frictional contact with the race or bearing block, while being allowed full freedom to rotate thereon. The raceway on the bearing block is of channel form to receive both the rollers and the cage, the cage engaging with the sides of the channel, thus serving to guide the rollers. The guided engagement of the cage with the raceway or bearing block minimizes wear and friction, since the rollers are not guided by engagement with the sides of the channel race or the like as in previous structures of this type. This anti-friction effect is increased by the use of wear-resistant and anti-friction material for the cage. The articulated cage thus cooperates with the bearing block or race to guide the rollers about the race in a direction substantially perpendicular to the axes of the rollers, minimizing loss of efficiency due to skewing of the rollers or sliding thereof on the race.

The invention also contemplates the provision of a bearing structure of a type provided with a protective cover or casing which cooperates with the block to define the guiding channel for the cage and rollers of the bearing, thus permitting a simplification of the construction of the block itself, and which blocks entry of dirt to the bearing.

2

The cage may take more than one form, in accordance with the functions which it is desired that it perform. Thus, it may be employed simply to hold the rollers in spaced independently rotatable relation on a race, the rollers being guided by engagement with the side walls of the channel raceway. Again, the cage may be employed both to mount the rollers for the desired spaced rotational movement on a race, and also to guide the rollers by engaging the side walls of the channel defining the race, the rollers being held out of frictional contact with such side walls. These forms of the cage retain the rollers in the desired assembled relation about the raceway, and allow release of the rollers therefrom upon opening or separation of the cage. The cage may also be formed to retain the rollers assembled therewith even when the cage is not mounted on a raceway or the like so that the cage and rollers may be freely handled as a unit after assembly, without danger of the rollers becoming separated or disassembled from the cage.

It is an object of the present invention to provide an articulated bearing construction which may readily be assembled and disassembled by reason of its simplicity of structure.

Another object is the provision of an articulated roller bearing construction which incorporates resilient elements which may easily be snapped and unsnapped into connected and disconnected relation with each other to facilitate assembly and disassembly.

Another object is the provision of an articulated roller bearing construction in which journalling means for the rollers are eliminated, yet the rollers are rotatably mounted in spaced relation.

It is another object to provide a recirculating roller bearing construction in which friction is greatly reduced although close guidance for the rollers is provided.

Another object is the provision of an articulated roller bearing construction by which the rollers are guided in proper relation along a raceway without frictional engagement therewith.

A further object of the invention is the provision of an articulated roller bearing construction including a cage for the rollers which minimizes skewing and sliding of the rollers without requiring journalling of the rollers by the cage.

Another object is the provision of an articulated cage for the rollers of a roller bearing which maintains the rollers on the race in freely rotatable spaced relation without shafts or like means for journalling the rollers.

It is also an object of the invention to provide a cage for the rollers of an articulated roller bearing which retains the rollers in spaced rotatable relation therein and against removal therefrom even in its free state removed from the bearing raceway.

Another object is the provision of an articulated roller bearing construction including a protective casing defining for at least a portion of the roller path means for guiding the rollers along the path.

Another object is the provision of an articulated roller bearing structure allowing the use of inexpensive rollers without impairment of roller guidance.

Other and further objects, advantages, and features of the invention will be apparent to those skilled in the art from the following detailed description, taken in conjunction with the accompanying drawings, in which:

FIGURE 5 is a view similar to FIGURE 4, showing a link of a roller cage of somewhat different form from that of FIGURES 1 to 4;

FIGURE 6 is a cross-sectional view of a recirculating roller bearing including a cage comprising links such as illustrated in FIGURE 5;

FIGURE 7 is a plan view of two connected links of another form of roller cage according to the invention;

FIGURE 8 is a side elevation of one of the links of FIGURE 7;

FIGURE 9 is a longitudinal sectional view taken substantially as indicated by the line 9—9 of FIGURE 7, showing the links in one extreme angular position they may assume relative to each other;

FIGURE 10 is a view similar to FIGURE 9, but showing the links in the other extreme angular position;

FIGURE 11 is a view partly in plan and partly in horizontal section, taken substantially as indicated by the line 11—11 of FIGURE 12, showing another recirculating bearing according to the invention, with parts omitted for clearness;

FIGURE 12 is a view partly in side elevation and partly in longitudinal section, taken substantially as indicated by the line 12—12 of FIGURE 11; and FIGURE 13 is a view partly in end elevation and partly in cross section, taken substantially as indicated by the line 13—13 of FIGURE 11.

Figure 1:
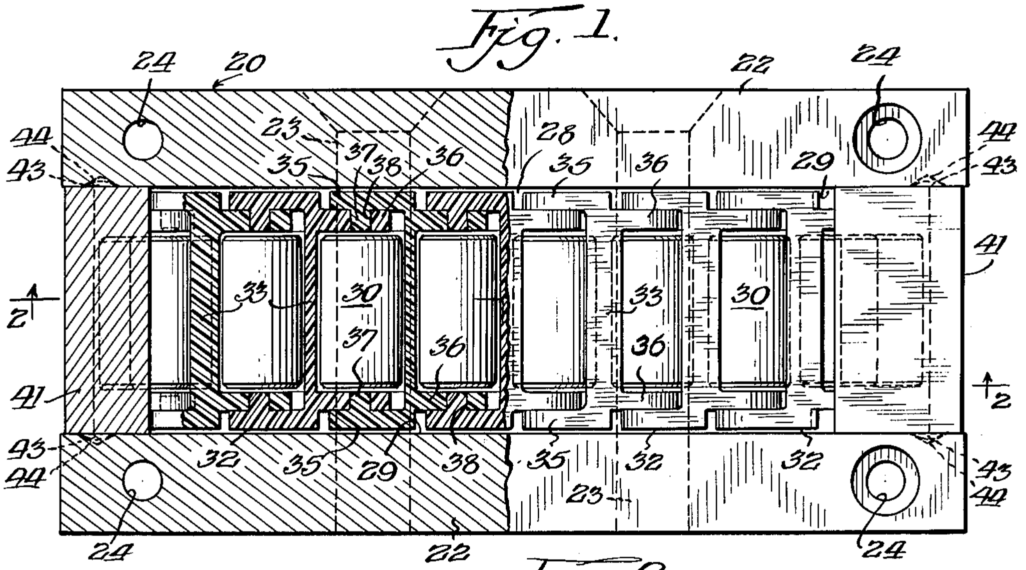
FIGURE 1 is a view partly in plan and partly in horizontal section of one embodiment of a roller bearing according to the invention, taken susbtantially as indicated by the line 1—1 of FIGURE 2.
Figure 2:
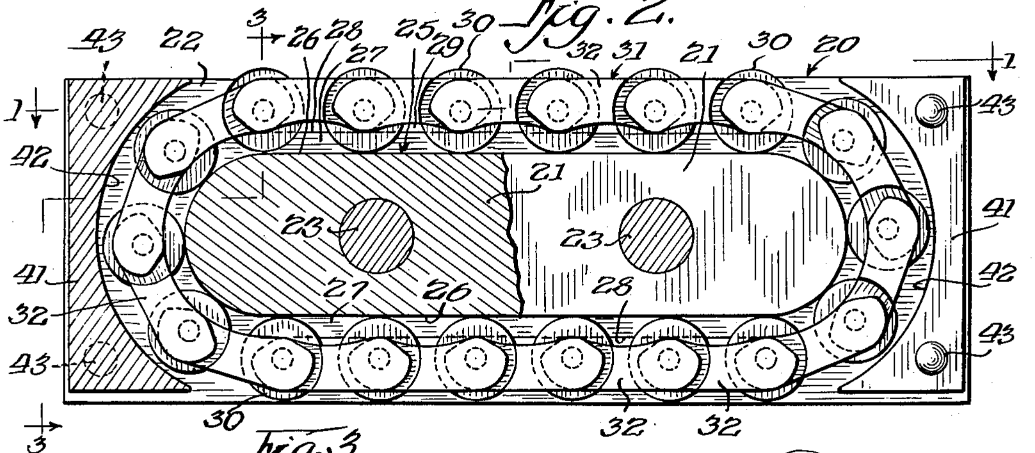
FIGURE 2 is a jogged vertical longitudinal sectional view taken substantially as indicated by the line 2—2 of FIGURE 1.
Figure 3:
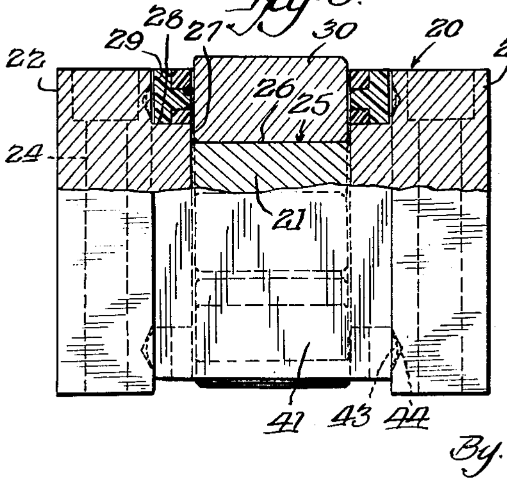
FIGURE 3 is a view partly in end elevation and partly in cross section, taken substantially as indicated by the line 3—3 of FIGURE 2.

Referring first to FIGURES 1 to 4 of the drawings, there is shown a recirculating roller bearing embodying the present invention and generally designated 20. The bearing comprises an elongated block formed of three sections including a central section 21 and two side sections 22, secured together in assembled relation by any suitable means, as for example screws 23 extending transversely therethrough. Assembly of the sections in precisely aligned or positioned relation may be effected by transverse positioning dowels, not shown, disposed in alignable apertures in the sections. The central portion has two substantially parallel surface portions extending between the side sections, connected by rounded end surfaces, as best shown in FIGURE 2, the side sections projecting peripherally outwardly of the central section. The side sections 22 are shown as provided with suitable bores 24 therethrough for the reception of mounting screws or like means, not shown, by which the bearing may be secured in position on one member for engagement with another member, the peripheral portions of the side sections which engage the one member providing mounting surfaces of the block. A channel, generally designated 25, providing a race for the rollers of the bearing extends about the central section 21. As best shown in FIGURE 2, the channel is continuous or endless, and as best shown in FIGURE 3, is of a stepped cross section. The bottom 26 of the channel is formed by the peripheral surface of central block section 21, being recessed or offset inwardly from the edges or peripheries of the side sections, and provides the race surface. Inner face portions 27 of side sections 22 extend perpendicularly from the channel bottom 26 to laterally spaced peripheral surface portions 28 of the respective side sections, these surface portions 28 extending laterally outwardly to inwardly directed surfaces 29 of the respectively adjacent side sections 22 and providing shoulders or ledges in the channel 25. The surfaces 29 define the outer sides or walls of the channel 25, extending perpendicularly from the ledges 28 to the adjacent peripheral edges of the side block sections 22, which project outwardly beyond the periphery of the central section 21.

On the channel bottom or race 26 travel the bearing rollers 30, each having a length substantially equal to the width of the race or channel bottom 26, so as to have the ends thereof guidedly engageable with the face portions 27, which serve as side walls of the race. Each roller 30 is maintained in rotatable engagement on the channel bottom or race 26, and in non-contacting or spaced relation to adjacent rollers, by an endless flexible or articulated cage generally designated 31.

Figure 4:
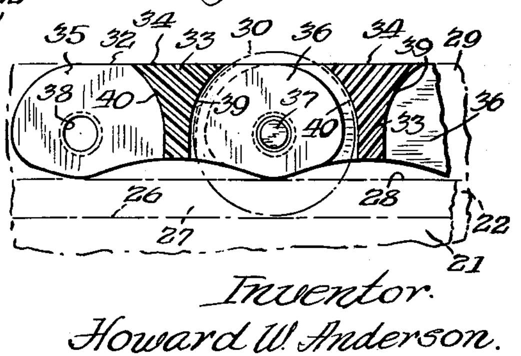
FIGURE 4 is an enlarged fragmentary longitudinal sectional view showing the construction and connection of two links of the cage in greater detail, with associated parts of the bearing shown in phantom.

The cage 31 is formed of a plurality of substantially identical links 32 pivotally connected to each other adjacent the ends thereof and defining pockets in which the rollers are received. Each link is formed with a transverse, central, or connecting portion 33 having in this instance a flat surface 34 partially defining the outer periphery of the cage. Two pairs of arms 35 and 36 extend in opposite directions from the central portion, the arms of each pair being substantially parallel and offset laterally relative to the arms of the other pair. In the present instance, the arms 35 are more widely spaced than the arms 36, the latter being offset inwardly of the former. The arms are shown with flat edge portions coplanar with the central portion surfaces 34, and defining therewith the outer periphery of the cage 31. Pivot studs 37 project from the inner faces of the arms 35, and apertures 38 are formed in the arms 36 adapted to receive the studs 37, so that the links 32 may be pivoted to each other, with the arms 35 of one link overlapping the arms 36 of the next. The central or connecting portions 33 of the links have a dimension perpendicular to the flat surfaces 34, or depth, somewhat greater than the radius of the roller 30, as best shown in FIGURE 4, and are formed with oppositely directed concave faces 39 and 40 formed arcuately or cylindrically about the axes of the studs 37 and apertures 38, respectively, and having flat tangential extensions thereof substantially normal to the flat surfaces 34, terminating at the peripherally inner edges of the central portions. The maximum width of the arms 35 and 36 is somewhat greater than the depth of the connecting portion 33, and the pivot studs 37 and apertures 38 are so located as to be substantially coaxial with the rollers 30 engaged in the cage, as indicated in phantom in FIGURE 4, and so that the connecting portions 33 are formed with a cross section having its greatest width at the flat outer peripheral surface thereof, the arcuate surfaces 39 and 40 diverging substantially from the common plane of the studs 37 and apertures 38 in the direction of the surface 34, all as will be best understood from FIGURE 4.

The radius on which these cylindrical or arcuate surfaces are formed is substantially equal to, or only slightly greater than, that of the rollers 30. The surface 39 of the central portion 33 of one link 32 and the facing surface 40 of the connecting portion 33 of the adjacent link pivoted to the first link thus define a pocket into which a roller 30 may be inserted, open at both the outer and inner peripheries of the cage, the peripherally outer opening of the pocket, between the opposing edges of adjacent central link portions 33 at the flat surfaces 34 being of a width less than the roller diameter. The peripherally inner open side of the pocket is at least equal to the roller diameter. The spacing between the arms 36 of each link correspond to the width of the channel bottom or bearing race 26, and hence to the length of the rollers. The rollers engaged in the pockets project radially out of the pockets beyond the outer periphery of the cage, and peripherally inwardly of the cage to bear on the race 26. Portions of the periphery of the rollers bear on the cylindrical surfaces 39 and 40, which facilitate rotation thereof in rolling on the bearing block and hold the rollers in substantially coaxial relation with the axes of the pivotal connections of the links provided by the studs 37 and apertures 38. The pockets allow easy insertion and removal of the rollers, which are held in spaced relation by the central portions 33.

The height of the race side wall portions 27 is such as to locate the shoulders or ledges provided by the laterally outwardly extending surface portions 28 of the side block sections 22 in position to receive and support thereon the peripherally inner edges of the links 32, as best shown in FIGURES 3 and 4. The shoulders provided by the surface portions 28 are of a width substantially corresponding to the combined width or thickness of the overlapping arms 35 and 36 of adjacent links 32, as will be evident particularly from FIGURE 3, but sufficiently wider to provide a slight clearance between the outer surfaces of the arms 35 and the inner surfaces of the side sections 22, or outer side walls of the channel 25, indicated at 29. In the present case, the width or height of the link arms 35 and 36 is shown as substantially equal to the distance between the shoulders 28 and the outer peripheral surfaces of the sections 22, or in other words equal to the height of the channel side walls 29, but this is not required by the invention.

The cage links 32 are formed of a material having properties of strength, resilience, wear resistance, and minimization of friction. The links might, for example, be formed of a suitable steel which could provide smooth arcuate surfaces for engagement with the rollers. The links are illustrated as formed of a molded plastic material, however, this material specifically being an acetal resin having the desired properties, marketed under the trademark "Delrin" by E. I. du Pont de Nemours & Company, of Wilmington, Delaware. This material, in addition to the wear resistance and resilience desired in the cage links, has inherent lubricity which greatly minimizes friction and contributes to smooth and consistent rotation of the rollers in the cage pockets.

The use of a resilient material for the links allows their pivotal connection to each other by merely bending the arms 35 and 36 so as to allow the pivot studs 37 to be snapped into the apertures 38, the link arms coming to overlapped parallel relation upon release of the bending stress thereon, as will be understood. The cage may thus be readily assembled and disassembled, since there is no need for relatively complicated fitting of parts one to another, and shafts, trunnions, gudgeons, or like means for journalling or rotatably mounting the rollers, are eliminated, the rollers rolling on the pocket surfaces. Similarly, washers, cotter keys, or other separable parts for holding the links and rollers in assembled relation are made unnecessary. The rollers may be inserted in the cage pockets by pushing thereof past the edges of adjacent central link portions 33, which yield to allow such insertion, after the assembled endless cage has been disposed about the central block section 21. One of the end caps 41 is omitted from the block assembly to allow access to the peripherally outer openings or mouths of the pockets of the cage at the portion extending about the adjacent rounded end surface of the central block section. At this location, as evident from FIGURE 2, the pockets are open to their widest so as to facilitate insertion of the rollers. The end cap is snapped into place after the rollers are assembled with the cage. In this arrangement, the cage serves primarily to retain the rollers in the channel or race 26, the engagement of the ends of the rollers with the side wall portions 27 of the race serving to guide the rollers. If desired, however, the guidance of the rollers by the wall portions 27 may be replaced by providing for guided engagement of the outer surfaces of the link arms 35 with the channel side walls 29, avoiding the stepped cross-sectional form of the channel.

The bearing construction includes a pair of end caps

41 disposed between the side sections 22 of the block adjacent the ends thereof, the caps having curved surfaces 42 directed toward the curved ends of the central section 21 of the block and uniformly spaced therefrom so as to conform to the curvature thereof and provide a passageway for the rollers. The end caps 41 are secured in position by clamping action thereon of the securing screws 23, the caps having projections 43 on their side faces which engage in dimples 44 provided in the inner faces of the side sections 22 to assure location of the end caps in the desired relation to the other portions of the block.

The cage and rollers may comprise a bearing assembly apart from the block, and be employed in linear arrangement between flat or curved parallel surfaces of relatively movable machine parts or other elements. In such case, the cage and roller assembly is mounted for free movement transversely of the roller axes, but is held against lateral movement.

The channel side walls 29 are higher, that is, the side sections 22 project farther peripheral outwardly of the central section, along the side of the bearing block which provides the mounting surface than along the opposite side, or in other words the race or channel bottom 26 is spaced farther inwardly of the mounting surface than of the opposite surface of the block, as shown in FIGURES 2 and 3. The flat portion of the race or channel 26 extending along such opposite surface is spaced inwardly thereof by a distance less than the roller diameter to define a loading zone, with the rollers 30 thereon projecting radially outwardly of this opposite surface, while the portion of the race or channel extending along the mounting surface of the block is recessed from the mounting surface by a distance greater than the roller diameter, so that the rollers may travel freely thereon in an unloaded condition.

In FIGURES 5 and 6, there is shown another roller bearing structure 50 similar to the bearing 20 but differing in certain respects. The bearing 50 employs a bearing block 51 generally H-shaped in cross section, shown as formed in one piece. The block 51 has an elongated central portion 52 with rounded ends, generally similar to the central section 21 of the block of bearing 20, but integrally connecting a pair of side portions 53 projecting peripherally outwardly beyond the surfaces of the central portion. As evident from FIGURE 6, this formation provides a channel 54 extending continuously or endlessly about the block having its bottom 55 provided by the surface of the central portion 52 and its sides 56 defined by the inner faces of the peripheral projections of the side portions 53 of the block. Like the bearing 20, the bearing 50 is adapted to be mounted on a member by means of screws or other appropriate securing members passed through bores 24 extending through the side portions 53. The peripheral surface portions of the side portions which engage on the member provide mounting surfaces of the block. The channel bottom 55 is recessed or spaced inwardly relative to these mounting surfaces by a distance greater than the diameter of the bearing rollers 30, while it is spaced inwardly from the opposite surfaces of the side portions by a distance less than the roller diameter, so that the rollers project outwardly beyond such opposite surfaces when disposed on this portion of the channel bottom, which constitutes a loading zone. In the deeper portion of the channel, the rollers are relieved of load in passing between the ends of the central portion 52. The channel is wider than the length of the rollers 30, so that it may receive an articulated cage 57 generally similar to the cage 31 between its sides 56.

The cage 57 is made up of links 58 similar to the links 32, having a cross or central portion 59 with two pairs of arms 60 and 61 extending oppositely therefrom. Links 58 differ from links 32 in having the cross or central portions 59 deeper or higher than the central portions 33 of the links 32, the arms 60 and 61 having their peripheral portions remote from the central portion 59 arcuately formed on a radius slightly less than that of the rollers.

The central portions of the links have the oppositely directed cylindrical faces 39 and 40 to provide pockets for the rollers substantially as in the case of the links 32, save that the flat surfaces perpendicular to the peripherally outer flat surfaces 34 and merging tangentially with the cylindrical surfaces 39 and 40 are longer, so that the roller-receiving pockets are deeper than in the links 32. The arms 60 are provided with the pivot studs 37, and the arms 61 with the apertures 38, as in the case of arms 35 and 36 of the links 32, the cage 57 being assembled by snapping together successive links in the desired number. The rollers disposed in the several pockets of cage 57 are independently rotatable, bearing on the cylindrical surfaces of the pockets and projecting through the spaces between opposed edges of the central portions 59 of adjacent links, as in the case of the links 32 of cage 31, and are held spaced from each other by the several central link portions. In the loading zone, the rollers project radially outwardly beyond the adjacent peripheral surfaces of the side portions 53 of the block, and at the opposite portion of the central portion 52 they fall inwardly of the plane of the adjacent peripheral surfaces of the side portions, or mounting surfaces, as appears clearly from FIGURE 6. The rollers in this embodiment of the invention do not have any frictional contact with the channel 54 which provides the roller race, the channel bottom not being stepped to provide guiding surfaces engaged by the ends of the rollers. Guiding of the rollers is effected by engagement of the outer faces of the arms 60 against the sides 56 of the channel 54, preventing any appreciable movement of the rollers transversely of the channel. As has been noted hereinabove, the cage 31 may be used in this manner, but the present arrangement has the advantage of providing a larger area of the cage in guided engagement with the channel sides 56, resulting in more accurate guidance, as well as larger wearing surfaces. The greater depth of the central portions and link arms also provides considerably greater strength in the links 58 than in links 32, giving a stronger cage.

The one-piece block 51 provides a stronger construction than might otherwise be obtained. It may be pointed out, however, that the block 51 may have the side portions 53 extend from the mounting surfaces only to a plane inwardly of the bottom 55 of the race or channel, as indicated in dot-dash lines at 62 in FIGURE 6, so as to allow both the loading zone surface and the mounting surfaces to be given a smooth, precise finish, as by lapping. In such case, the sides 56 of the channel may be provided by a pair of bars indicated at 63 bolted or otherwise removably secured on the narrowed side portions 53 to project peripherally outwardly of the loading zone.

Both the cages 31 and 57 will hold the rollers 30 in proper position on a race or way, whether formed into an endless or continuous cage as illustrated in the drawings, or disposed in linear arrangement between a pair of relatively reciprocable members or parts, as already described. The cage 57 is preferably from the standpoint of strength, since the greater depth of the links 58 imparts to them rigidity and strength exceeding those of the links 32. The pockets of cage 57 are deeper than those of the cage 31, but the openings of the pockets at the inner periphery of the cage are at least as wide as the roller diameter when adjacent links are in linear or planar alignment, so that the rollers may readily be inserted and removed, and also may drop from the pockets if not prevented by an underlying race or similar surface. The other opening of the pocket, at the outer periphery of the cage, is too narrow to permit passage therethrough of a roller even when the adjacent links are pivoted through a considerable arc relative to each other, and thus prevent disengagement of the rollers from the cage assembly through these openings.

In FIGURES 7 to 10 inclusive there is illustrated a portion of a cage generally designated 70, which holds the rollers in the pockets regardless of the angle relative to each other to which adjacent links may be swung, stop means being provided to limit pivoting movement of the links. Two links 71 are shown as comprising the illustrated portion of the cage 70, each link being generally similar to the links 32 and 58, but differing therefrom in certain respects. Each of the links 71 has a central portion 72 from which extend oppositely directed pairs of arms 73 and 74, the parallel arms 73 being spaced apart more widely than the arms 74 so as to receive between them the arms 74 of an adjacent link, as clearly shown in FIGURE 7. The arms 73 have the pivot studs 37 on their inner faces, and the apertures 38 are formed in the arms 74 to receive the studs 37 of an adjacent link when the links are assembled, to provide pivotal connection of the links, as in the case of links 32 and 58. The central portion 72 of each link has a cylindrically concave surface 39 taken about the axis of studs 37, extending from the flat peripherally outer surface 34 of the central portion substantially to the plane of the axes of the studs 37 and apertures 38, and continuing to the inner periphery of the cage in a substantially flat tangential surface portion substantially perpendicular to the flat outer surface, substantially as in the links 58, the radius of the surface 39 being the same or slightly greater than that of the bearing rollers 30.

The face of the central portion 72 directed oppositely from the concave surface 39 is provided by a cylindrically concave surface 75 formed on a radius the same as or slightly greater than that of the rollers 30 and about the axis of the aperture 38. The surface 75 extends from the flat peripherally outer surface of the central portion beyond the plane of the stud and aperture axes, to the inner periphery of the cage. The edge formed by the peripherally inner surface of the central portion 72 and the surface 75 is spaced from the facing surface of the central portion of the adjacent link by a distance less than the diameter of the rollers 30 when the links are in the same plane. A roller 30 in the pocket defined by the inner faces of the overlapped link arms 73 and 74 of adjacent links and the facing surfaces 39 and 75 of the central portions is thus held against removal or dropping out when the links are substantially aligned, since the outer peripheral opening of the pocket is also less than the roller diameter.

Relative pivotal movement of adjacent connected links 71 of cage 70 is limited by stops. The stop arrangement is illustrated in this instance as comprising a flat surface 76 on the outer side of each link arm 74 substantially perpendicular to the flat peripherally outer surface 34 of the central portion 72 and extending therefrom to a point adjacent the plane of the axes of studs 37 and apertures 38, there connecting with another substantially flat surface 77 extending at an angle toward the arms 73 and the inner periphery of the cage across the plane of the pivot studs and apertures, an arcuate surface 78 extending from the surface 77 to the peripherally inner edge of the link. The surface 78 is formed on a greater radius than the cylindrical surface 75 and about the axis of the studs 37, so as to extend parallel to surface 75 although spaced radially therefrom. The structure provided by the surfaces 76, 77, and 78 will be apparent particularly from FIGURE 8. The end edges of the link arms 74 are arcuate, but those of the arms 73 are partially defined by angularly related flats 79 and 80 cooperable with the surfaces 76 and 77 to limit pivotal movement of the links in either direction relative to each other. The flat edge portion 79 of each arm 73 extends substantially parallel to the surface 76, or substantially perpendicular to the plane of the pivot studs and apertures, and is connected by a rounded edge portion to the flat edge portion 80, which in this instance extends at an angle of approximately 150° thereto from the rounded portion to the peripherally inner edge of the arm 73.

As will be evident from FIGURES 9 and 10, if the adjacent links are pivoted about their connection in a direction to narrow the opening between the central portions 72 at the peripherally outer surfaces thereof, or in other words to widen the opening at the peripherally inner portion of the roller pocket, the flat edge portions 79 of the arms 73 of one link engage the flat surfaces 76 of the adjacent link to stop the pivotal link movement before the peripherally inner opening of the pocket becomes wider than the diameter of the roller 30, so that the roller cannot leave the pocket. Similarly, when the links are swung about their pivotal connection in the other direction, so as to widen the peripherally outer opening of the pocket, the flat edge surfaces or portions 80 of one link engage the angled flat surfaces 77 of the adjacent link and stop pivoting of the links before the pocket opening attains a width equal to the roller diameter, as shown in FIGURE 10, in which the roller is shown in phantom outside the pocket. The roller 30 thus is retained in the pocket despite the angular disposition of the adjacent links. Obviously, when one of the pocket openings is widened by pivotal movement of the links, the other is narrowed.

The pivotal movement allowed the links in either direction is determined by the location and angularity of the stop shoulders 76 and 77 and the edge surfaces 79 and 80, and the spacing therebetween in the aligned position of the links. In the present case, the stop shoulders 76 and the edge surface 79 are parallel in the aligned link position, so that the degree of pivotal movement of the links to widen the peripherally inner opening of the roller pocket is determined by the spacing between the surface 79 and the shoulder 76. As evident from FIGURE 9, this spacing is slight, to allow only a slight rotation of one link relative to the other in the direction indicated. When the links are pivoted so as to widen the peripherally outer opening of the pocket, considerably greater movement is permitted by reason of the angle between the stop shoulder 77 and the flat edge portion 80, as well as the spacing of the end edge of the arms 73 of the one link from the stop surfaces of the other. If the flat surface 80 were more sharply angled relative to the flat surface 79, or the shoulder 77 more sharply angled from the stop shoulder 76, or both, the pivotal movement between the links would be greater, while if the angles were more obtuse, the movement would be more limited. Similary, greater or smaller spacing between the end edges of the arms and the stop surfaces would allow greater or less pivotal movement of the links. It will be evident that the arcuate surface 78 provides a recess allowing free movement of the rounded corner at the juncture of the flat surface 80 and the peripherally inner edge suface of the arm 73.

To insert the rollers in the pockets of the cage 70, each pair of adjacent links is pivoted to the position affording the widest opening of the intervening pocket at the outer cage periphery, as shown in FIGURE 10, which width as already explained is less than the diameter of the roller 30 shown in phantom. By reason of the resilience of the material of which the links are made, however, the roller may be inserted in the pocket between adjacent links, by pushing thereof past the feather edges of the adjacent link central portions 72, the edges yielding to allow snapping of the roller into the pocket and then returning to their normal condition. The rollers may similarly be snapped into the pockets through the peripherally inner openings thereof, with adjacent links related as illustrated in FIGURE 9. The links 71, of course, may readily be assembled to form the cage 70, whether in endless or continuous form or not, by deformation of the link arms to allow the pivot studs 37 to engage in the apertures 38, with the arms then by reason of their resilience returning to their normal straight or flat condition, as in the case of the cages 31 and 37. The cage and roller assembly may thus readily be handled as a unit without any danger of the rollers becoming separated from the cage. The bearing rollers may, of course, be assembled with either of the cages 57 and 70 in substantially the same manner as explained in connection with the cage 31, when the cages are in endless form extending about the block.

It will be evident that the cage 70 is adapted to be used in the same manner as the cage 57, and may be applied to the block 52 and otherwise perform all of the functions of the cage 57, in addition to retaining the bearing rollers 30 in assembly therewith. Both the cages 57 and 70 by guidingly pocketing the rollers not only eliminate need for journal means, but allow the use of spherical-ended rollers instead of rollers with ground ends, as is necessary for close guidance when the rollers are guided by surfaces such as the wall portions 27. The cage 31 provides this same advantage when used to guide the rollers in the manner of cages 57 and 70.

Another embodiment of the bearing of the invention is illustrated in FIGURES 11 to 13 inclusive, and generally designated 90. The bearing comprises a block generally designated 91, preferably formed in one piece as shown, and having a central elongated bearing portion 92 having a pair of parallel flat surfaces, one of which constitutes a loading zone 93, with rounded end portions connecting the ends of the flat surfaces, as best shown in FIGURE 12. The flat and rounded end surfaces of the central portion of the block provide a race for the roller bearings, substantially as in the case of the central block portions 21 and 52 previously described. Extending to each side of the central portion 92 are side portions 94 of the block which extend from a plane substantially flush with the loading zone 93 or depressed relative thereto, and project beyond the plane of the other flat surface of the central block portion 92 to a common plane, the end surfaces in said plane serving as a mounting surface for the bearing. The side portions 94 are in this case shown as of a length corresponding to the lengths of the flat surfaces of the central portion, the rounded end portions projecting beyond the ends of the side portions, although of course the dimensions may vary as may be appropriate. As will be evident from FIGURES 12 and 13, the projection of the side portions 94 beyond the other flat surface of the central portion 92 is slightly more than the diameter of bearing rollers 30, so as to allow a slight clearance allowing the rollers to pass along this other flat surface with no load imposed thereon. A portion 95 of each side portion 94 adjacent the end or mounting surface thereof projects laterally outwardly a slight distance, as best shown in FIGURE 13. The projecting portion 95 provides an accurate surface for location when mounting the bearing, as on a machine member or element. A plurality of bores 24 extend through each of the side portions 94 to accommodate screws or like means, not shown, by which the bearing is mounted on a machine, member, or the like with the mounting surfaces engaging thereagainst, in the previously-described blocks. One or more threaded bores 96 are also provided in each of the block side portions 94 for purposes of assembly as hereinafter explained.

A shroud or casing generally indicated as 97 is provided for engagement on the block 91, formed of sheet metal in a hollow shape generally conforming to the shape of the block 91. The casing 97 has a central portion of an interior width substantially corresponding to the width of the central block portion 92, and of greater length, defined by flat side wall portions 98 and end walls 99. Each of the end walls has a portion 100 thereof curving in correspondence to the rounded end portions of the central block portion 92 and merging with a flat wall portion 101, as best shown in FIGURE 12, extending between opposed side wall portions 98 and having its edge flush with the adjacent edges thereof. The casing 97 is provided with laterally outwardly offset side wall portions 102 connected to the side wall portions 98 by transversely extending wall portions 103, and cover wall portions 104 extend inwardly between wall portions 103 to the upper ends of side wall portions 102. The side wall portions 98 project beyond the planes of the adjacent covering wall portions 104 and are connected along the sides of the casing by flanges 105 at the inner ends of the covering portions 104, as best shown in FIGURE 13, the edges of which are flush with the edges of the wall portions 98 and 101. These edges define one open side of the casing, which has another open side defined by the opposite edges of the side wall portions 98, end walls 99, offset wall portions 102, and transverse portions 103. The lower portions of the offset walls 102 are cut away between the transverse walls 103, as shown at 106.

Assembly of the casing 97 and block 91 is accomplished by slipping the casing over the block, which is received through the open side defined by side wall portions 98, end walls 99, offset wall portions 102, and wall portions 103. The flat sides of the rounded end portions of the central block portion 92 engage between the opposing side wall portions 98 at corresponding ends of the casing, and the side portions 94 of the block are engaged in the laterally extending recesses provided by the offset side wall portions 102, transverse wall portions 103, and covering wall portions 104. The curved end wall portions 100 define passages for the cage and roller assembly from the loading zone 93 along the rounded end portions, as evident from FIGURE 12. The cutaway portions 106 of the laterally outwardly offset side wall portions 102 accommodate the lateral projections 95 of the side portions 94 of the block, as will be evident particularly from FIGURE 13. The laterally projecting portions 95 may be omitted if desired, however, and the cutouts 106 eliminated to leave the offset side wall portions 102 extending to the plane of the mounting surfaces of the block 91, like the other walls of the casing. The wall portions 102 may in such case be employed for location of the bearing instead of the portions 95. The casing 97 shields the bearing against accidental blows, and also serves to exclude, in large measure, dirt or harmful particles. If desired, a seal may be mounted on the casing edge about the loading zone to engage closely with the adjacent relatively movable member or machine part to protect against dust and the like. The covering wall portions overlie the side block portions 94 and are provided with apertures 107 located and dimensioned to allow access to the mounting screw bores 24 therein. Socket head screws 108 or the like extend through suitable apertures provided therefor in the covering portions 104 and are threaded into the bores 96 to secure the casing 97 to the block 91. The flanges 105 and the side wall portions 98 define with the loading zone 93 a channel for guiding the roller and cage assembly about the central portion of the block, or in other words about the race.

The cage and roller assembly is shown in the present instance as comprising the cage 31 heretofore illustrated and described, carrying and guiding the rollers 30 on the race provided by the central bearing block portion 92. As pointed out in connection with the cage 31, it may be used to guide rollers by engagement of its outer surfaces with the inner walls of a guide channel, in the same manner as the cage 57 and the cage 70, and is illustrated in FIGURES 11 to 13 as so employed. As evident particularly from FIGURE 13, the outer side surfaces of the links 32 of the cage 31 bear on the inner surfaces of the flanges 105 and side wall portions 98 to prevent any significant transverse motion of the rollers 30, substantially in the same manner as illustrated in FIGURE 6 in connection with the roller guidance by the cage 57. It will be understood, of course, that either of the cages 57 or 70 might be employed in the bearing 90, since the guidance channel provided by the block and casing construction does not have a stepped cross-sectional configuration requiring the shallower construction of cage 31. The casing 97, of course, might be provided with inwardly extending portions to overlie the central block portion 92 and engage the ends of the rollers 30 to provide guidance therefor in the same manner as the side wall portions 27 of the channel 25 in the block of the bearing 20. As pointed out hereinabove, however, it is generally preferable to guide the rollers by means of the outer faces of the cage bearing on the inner faces of a guiding channel. In any case, the channel in the bearing 90 is not formed in the block itself, the construction permitting both the loading zone surface and the mounting surfaces to be lapped to a precise finish, or otherwise given a desired smooth and accurate finish in a rapid and efficient manner.

It will be evident that the bearing of the present invention is readily adaptable to use wherever rectilinear reciprocating motion between machine elements or similar members occurs, and is especially suited for applications where very low and uniform frictional forces are desired between parallel surfaces, whether flat or curved. The bearing may be employed either in the recirculating form employing the cage as an endless member encircling a bearing race, or in linear form with the cage allowed free movement in the direction of relative movement of the parts or elements between which it is disposed.

While the invention has been disclosed as embodied in a roller bearing, it is readily applicable to spherical anti-friction elements, such as ball bearings, it being only necessary to modify the form of the links to provide spherical rather than cylindrical surfaces, so that the pockets in the cage are adapted to receive and retain spherical rather than cylindrical elements. By reason of the formation of the links in accordance with the invention as disclosed hereinabove, the length of the cage may readily be varied in multiples of the pitch, and great freedom of design in bearings of the type disclosed is allowed by the modular characteristics of the cage resulting from its construction from uniform links.

While several embodiments of the invention have been illustrated and described herein, it is to be understood that the inventive concept disclosed is not intended to be limited to the particular embodiments specifically disclosed, since various changes and modifications therein may readily be made without departing from the spirit and scope of the invention.

I claim:

1. In a recirculating anti-friction bearing structure, a bearing block having a central portion providing an endless race including a loading zone, said block also having a pair of side portions projecting beyond the portion of said race opposite the loading zone to define a channel therewith, a plurality of anti-friction elements rolling on the race, an endless articulated cage maintaining said rolling elements on the race in spaced relation, a casing substantially enclosing the block having an opening overlying the loading zone partially defined by a pair of parallel wall portions extending along the side of the zone to define a channel portion therewith of a width corresponding to that of said channel and receiving the cage and rolling elements therein with the outer side surfaces of the cage engaging said wall portions for effecting guidance of the rolling elements, said channel having a depth at least equal to the diameter of the rolling elements.

2. In a recirculating anti-friction bearing, a bearing block having a central portion providing an endless race including a loading zone, said block also having a pair of side portions located laterally outwardly of said race and projecting beyond the portion of the race opposite said loading zone to define a channel therewith, parallel means removably secured on the block extending along the sides of the loading zone to define a channel portion therewith, an endless articulated cage extending about the race with its outer side surfaces engaging said parallel means and said side portion projections for guidance thereby, and a plurality of anti-friction elements rolling on the race retained and guided thereon by the cage.

3. A recirculating rolling bearing construction comprising a bearing block, means defining a channel about said block providing a bearing race, said means being comprised of a race surface on the block and a casing enclosing the block having parallel wall portions extending along the opposite sides of said race surface and forming channel sides to define with said surface a portion of the length of the channel, an endless articulated cage disposed in said channel extending about the block in overlying relation to said race comprising a plurality of links each having a central portion with oppositely directed arcuately concave surfaces and two oppositely extending pairs of parallel arms each pivotally connected to a pair of arms of an adjacent link, a plurality of peripherally inwardly facing pockets in said cage each defined by the facing concave surfaces and pivotally connected pairs of arms of adjacent links and having an opening at the outer periphery of the cage, an anti-friction rolling element in each pocket having a radius corresponding to that of said surfaces disposed substantially coaxially with the pivotal connection of the adjacent links engaging the race and retained in engagement therewith by the cage, each rolling element having radial projection outwardly of the cage through the peripherally outer opening, and said rolling elements having radial projection outwardly of said channel along a portion of the length thereof.

4. A recirculating rolling bearing construction comprising a bearing block, means defining a channel about said block providing a bearing race, said means being comprised of a race surface on the block and a casing enclosing the block having parallel wall portions extending along the opposite sides of said race surface and forming channel sides to define with said surface a portion of the length of the channel, an endless articulated cage disposed in said channel extending about the block in overlying relation to said race comprising a plurality of links each having a central portion with oppositely directed arcuately concave surfaces and two oppositely extending pairs of parallel arms each pivotally connected to a pair of arms of an adjacent link, a plurality of peripherally inwardly facing pockets in said cage each defined by the facing concave surfaces and pivotally connected pairs of arms of adjacent links and having an opening at the outer periphery of the cage, an anti-friction rolling element in each pocket having a radius corresponding to that of said surfaces disposed substantially coaxially with the pivotal connection of the adjacent links engaging the race and retained in engagement therewith by the cage, each rolling element having radial projection outwardly of the cage through the peripherally outer opening, said rolling elements having radial projection outwardly of said channel along a portion of the length thereof, and said wall portions of said casing being spaced apart a distance to receive the cage therebetween with the outer link faces bearing thereon to guide the rolling elements.

References Cited by the Examiner

UNITED STATES PATENTS

| | | | |
|---|---|---|---|
| 1,266,572 | 5/1918 | Fisher | 74—250 |
| 1,293,606 | 2/1919 | Young | 74—252 X |
| 1,413,099 | 4/1922 | Cox | 74—248 X |
| 1,966,266 | 7/1934 | Skelly | 308—217 |
| 2,366,238 | 1/1945 | Clausen. | |
| 2,723,886 | 11/1955 | Warshaw. | |
| 2,969,267 | 1/1961 | Gothberg | 208—217 |
| 2,977,164 | 3/1961 | Witte | 308—217 |
| 3,003,828 | 10/1961 | Stark. | |
| 3,061,046 | 10/1962 | Gunning. | |
| 3,064,795 | 11/1962 | Kaufer | 74—250 X |
| 3,111,350 | 11/1963 | Anderson | 308—6 |
| 3,127,980 | 4/1964 | Lanham | 74—250 X |

FOREIGN PATENTS

| | | |
|---|---|---|
| 1,073,668 | 3/1954 | France. |

ROBERT C. RIORDON, *Primary Examiner.*

FRANK R. SUSKO, *Examiner.*